April 6, 1965 W. H. DANIELS 3,177,033
VEHICLE COMPARTMENT CLOSURE
Filed Sept. 20, 1962 2 Sheets-Sheet 2
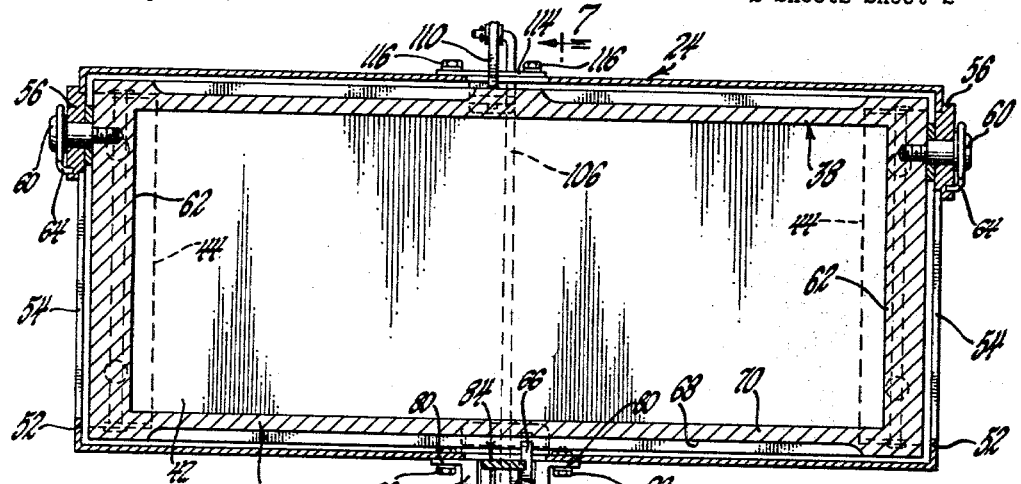
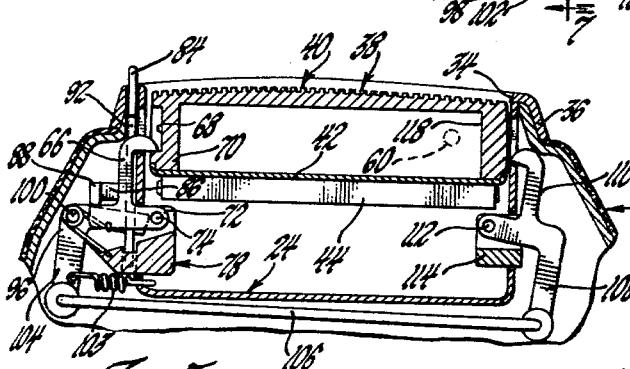
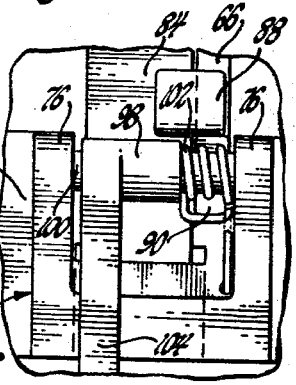
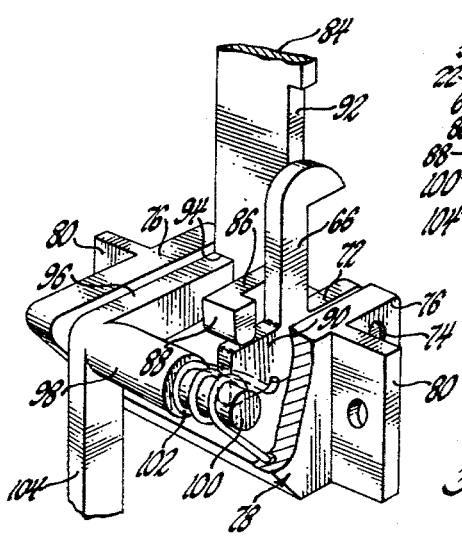
INVENTOR.
William H. Daniels
BY
Herbert Furman
ATTORNEY

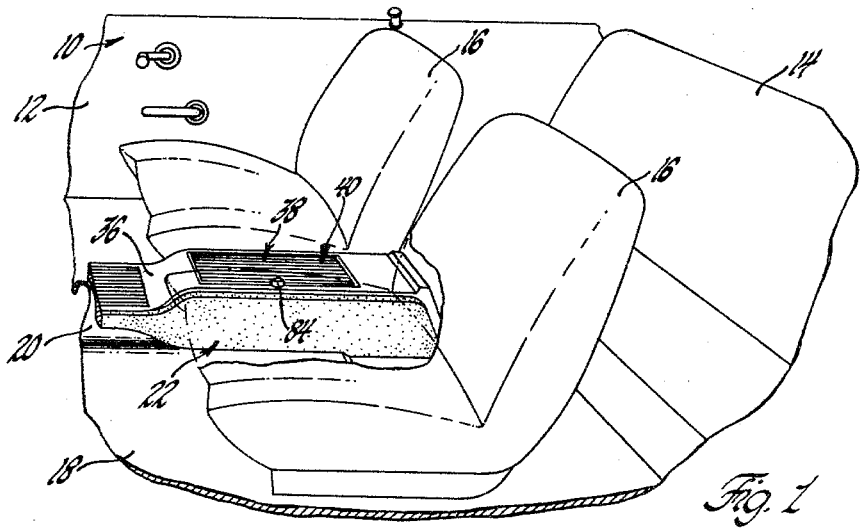
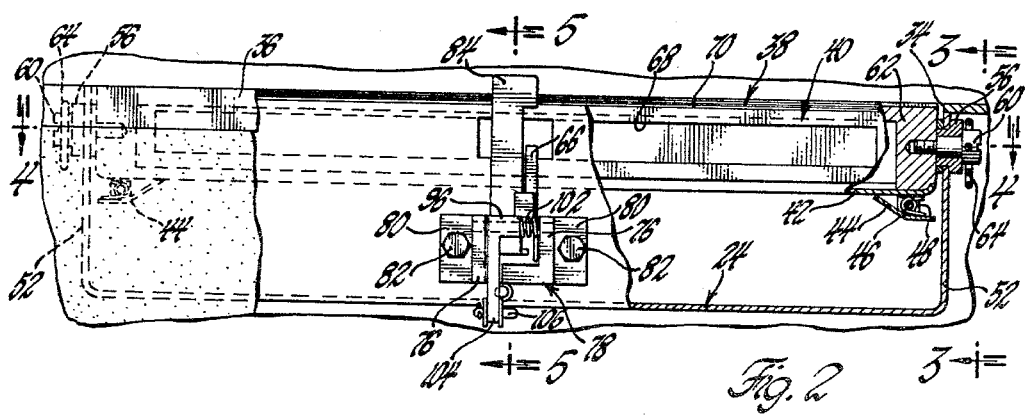
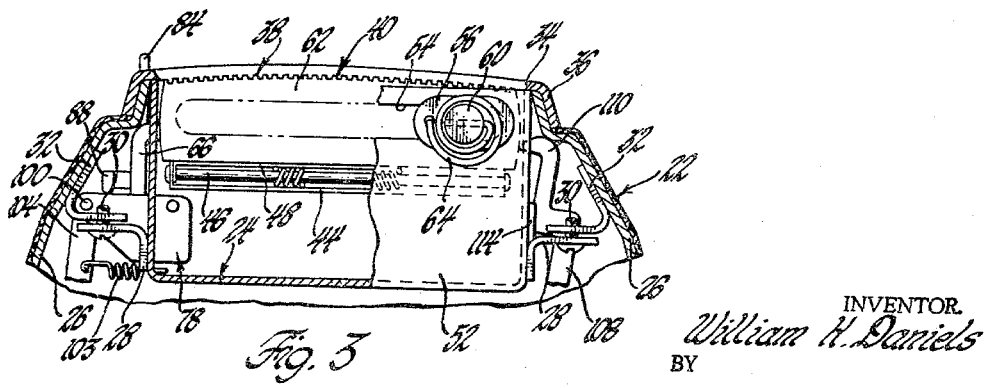

United States Patent Office 3,177,033
Patented Apr. 6, 1965

3,177,033
VEHICLE COMPARTMENT CLOSURE
William H. Daniels, Southfield, Mich., assignor to General Motors Corporation, Detroit, Mich., a corporation of Delaware
Filed Sept. 20, 1962, Ser. No. 225,103
4 Claims. (Cl. 296—37)

This invention relates to vehicle closures and more particularly to a vehicle compartment cover arrangement.

In the preferred embodiment of the invention, the cover is movable between a normal position wherein it closes the opening of a compartment and a second reversible position wherein the cover also closes the opening of the compartment and can be used as a writing surface. The cover is mounted on the compartment for movement between these two positions by pivotal and slidable hinge means and is held in each of its positions by selectively operable latch means. While the cover arrangement is particularly intended for use with compartments located in vehicle body tunnel consoles, it has a wide range of usefulness and may be used in other places.

The primary object of this invention is to provide an improved vehicle compartment cover arrangement. A more specific object of this invention is to provide an improved vehicle compartment cover arrangement which includes a reversible cover pivotally and slidably movable between reversed positions within the opening of a vehicle body compartment and being held in either of these positions by releasable latch means.

These and other objects of the invention will be readily apparent from the following specification and drawings wherein:

FIGURE 1 is a partial perspective view of a vehicle body having a tunnel console and a compartment in the console embodying a cover arrangement according to this invention;

FIGURE 2 is an enlarged partially broken away view of a portion of FIGURE 1 showing the cover in normal position;

FIGURE 3 is a partially broken away view taken generally along the plane indicated by line 3—3 of FIGURE 2;

FIGURE 4 is a sectional view taken generally along the plane indicated by line 4—4 of FIGURE 2;

FIGURE 5 is a sectional view taken generally along the plane indicated by line 5—5 of FIGURE 2;

FIGURE 6 is an enlarged view of a portion of FIGURE 2;

FIGURE 7 is a view similar to FIGURE 5 and showing the cover in its other position, and FIGURE 8 is an enlarged partially broken away partial perspective view of a portion of FIGURE 5.

Referring now particularly to FIGURE 1 of the drawings, a vehicle body 10 includes a front door 12, a rear seat 14, and a pair of front seats 16 of the "bucket" type. The floor pan 18 of the vehicle includes a central tunnel 20 to allow for passage of the drive shaft between the front and rear ends of the vehicle and a decorative tunnel console 22 is mounted on the tunnel 20 intermediate the seats 16. Console 22 is of hollow box-like construction and a compartment or box 24, FIGURE 3, fits between the side walls 26 of the console and is secured in place by brackets 28 secured to the side walls of the compartment 24 and bolted at 30 to brackets 32 secured to the walls 26 of the console. The compartment 24 opens upwardly through an opening 34 in the upper wall 36 of the console. Since the details of the console form no part of this invention, they will not be described since the console may be of any known construction.

The opening 34 and the opening of the compartment 24 are opened and closed by a cover arrangement 38 according to this invention. As best shown in FIGURES 5 and 6 of the drawings, arrangement 38 includes a cover 40 of generally hollow box-like construction having an upper ribbed wall which normally faces outwardly of the opening 34 and a lower flat wall 42 which provides a writing surface for the occupants of the seats 16 when wall 42 faces outwardly of the opening 34, as shown in FIGURE 7. A conventional clamp member 44, FIGURE 2, is pivoted at 46 to a bracket 48 secured to wall 42 and is biased into engagement with the wall 42 by suitable torsion springs to provide a clamp for paper or other writing materials which may be secured to the wall 42.

Each end wall 52 of the compartment 24 is provided with a generally horizontally disposed elongated closed slot 54. Headed guides or slidable members 56 include reduced portions slidably and nonrotatably received in respective slots 54. Each member 56 rotatably supports a headed stud 60 having the inner threaded end thereof secured in a tapped opening in the thickened end walls 62 of the cover 40 to mount the cover on the compartment 24. A coil torsion spring 64 has one end thereof fitted within a bore in the head of a respective stud 60 and the other end thereof secured to a respective member 56. The free position of springs 64 corresponds to a position of cover 40 intermediate its normal position, as shown in FIGURES 3 and 5, and its reverse position, as shown in FIGURE 7, wherein the cover 40 would be generally vertically disposed. Thus, when the cover 40 is in its normal position, springs 64 bias the cover clockwise, as viewed in FIGURES 3 and 5, toward its reversed position, and when cover 40 is in its reverse position, springs 64 bias the cover counterclockwise toward its normal position. Thus, if the cover 40 were not held in both its normal and its reverse positions, it would be partially open in either of these positions.

The cover 40 is held in its normal position against the action of the springs 64 by a hook type latch bolt or member 66 which projects through an opening in one side wall of compartment 24 and engages within a longitudinal groove 68 in one of the side walls 70 of the cover. Member 66 includes a lateral leg 72, FIGURE 8, pivoted at 74 between the legs 76 of a U-shaped bracket 78 which extends partially within an opening in one of the side walls of the compartment 24 and includes lateral flanges 80 which abut this side wall to each side of the opening and are bolted thereto at 82. A push button member 84 has the lower end thereof slidably mounted within a guide bore in the lower tapered wall of bracket 78 and includes a laterally extending leg 86 which terminates in a shoulder or abutment 88 bearing against a lateral leg 90 of latch member 66. One of the side walls of member 84 is cut away at 92 to allow for movement of members 66 and 84 relative to each other, and the other side wall of member 84 is cut away to provide a shoulder 94 engageable with one leg of a bellcrank member 96. Member 96 includes an integral sleeve 98 which is rotatbly mounted on a pin 100 extending between the side walls 76 of bracket 78. A coil torsion spring 102, located between sleeve 98 and one of the side walls 76 of bracket 78 has one leg thereof hooked within the lower wall of bracket 78 and the other leg thereof engaging under the leg 90 of latch member 66 to bias the latch member 66 in a clockwise direction, as viewed in FIGURE 5, and in turn locate the member 84 in its position, as shown in FIGURES 2 and 5, by the engagement of the shoulder 88 of the push button member with the leg 90. A spring 103 hooked between the one side wall of compartment 24 and the other leg 104 of bellcrank 96 biases the bellcrank 96 counterclockwise about the pin 100, as viewed in FIGURES 5 and 8. A shiftable rod 106 extends underneath the compartment 24 and has one end thereof pivoted to the leg 104 of bellcrank 96 and the other end thereof pivoted to a depending leg 108 of a second hook type latch bolt or member 110. Member 110 is pivoted at 112 between the legs of a bracket 114 which projects within an opening in the other side wall of the compartment 24 and is bolted thereto at 116, FIGURE 4. Member 110 is movable into and out of engagement with the other side wall 118 of cover 40 through an opening in the other side wall of the compartment 24.

When the cover 40 is in its normal position, as shown in FIGURES 2, 3 and 5, the engagement of the latch member 66 within the groove 68 holds the cover in this position against the action of the springs 64. The latch member 110 slidably engages the other side wall 118 of the cover 40 under the action of the spring 103 to locate the one leg of the bellcrank 96 slightly spaced from the shoulder 94 of member 84. If it is desired to open the cover 40, the member 84 is depressed and the engagement of the protuberance 88 with the leg 90 of latch member 66 swings this latch member counterclockwise about the pivot 74 against the action of the spring 103 so that the springs 64 will swing the cover 40 slightly clockwise, as viewed in FIGURES 3 and 5, to a partially open position. The engagement of the shoulder 94 of the member 84 with the bellcrank 96 will swing the bellcrank slightly clockwise about the pin 100 against the action of spring 103 to shift the latch member 110 out of engagement with the other side wall 118 of the cover 40. After the springs 64 have moved the cover 40 to a partially open position, the member 84 may be released and the springs 102 and 103 will return the latch member 66 to its vertically disposed position, as shown in FIGURE 5, while the spring 103 will move the latch member 110 also to a vertically disposed position. The operator can then insert his fingers within the groove 68 to rotate the cover 40 in a clockwise direction, with the springs 64 aiding this movement until the cover 40 is vertically disposed. Access may then be obtained to compartment 24.

If the operator desires to reverse the cover 40, he can simultaneously shift the cover 40 to the left, as viewed in FIGURES 3 and 5, while continuing to rotate the cover 40 in a clockwise direction until the cover 40 is located in its reverse position, as shown in FIGURE 7, wherein the engagement of the upper edge of wall 70 with the latch member 110 will first rotate this latch member slightly clockwise about the pivot 112 until the latch member 110 can return to its generally vertically disposed position, as shown in FIGURE 7, in engagement with the groove 68 to retain the cover in this position against the action of the springs 64 which will have been wound up as the cover 40 is moved from its vertically disposed position to its reverse position. The latch member 66 will be swung slightly counterclockwise about the pin 74 due to the engagement therewith with the other side wall 118 of cover 40 and will remain in this position, as shown in FIGURE 7, under the action of the spring 103. The lower wall 42 of the cover 40 can then be used as a writing surface and will close the opening of the compartment 24.

It will be noted that both side walls 70 and 118 are slightly arcuate so as to aid in camming the latch members 66 and 110 during movement of the cover 40.

If it is desired to return the cover 40 to its normal position, the push button member 84 will be depressed, as previously described, to move both latch members 66 and 110 out of engagement with the cover 40. Release of the latch member 110 from within the groove 68 will allow the springs 64 to bias the cover 40 slightly counterclockwise to a partially open position wherein the operator can then grasp the cover 40 and rotate the cover further counterclockwise while shifting the cover to the right until the cover has been moved to its normal position, as shown in FIGURE 5, and the latch member 66 will again engage within the groove 68 to retain the cover in this position while the latch member 110 will slidably engage the other side wall 118 of the cover. The springs 64 will be wound up as the cover is moved from its vertically disposed position to its normal position.

Thus, this invention provides a new and improved compartment cover arrangement.

What is claimed is:

1. In combination with a vehicle body including a compartment therein, a cover arrangement for said compartment comprising, a cover member for closing the opening of said compartment, guide means defining a path of movement transverse of said compartment, guided means movable along said guide means, means pivotally interconnecting said guided means and said cover member to mount said cover member on said compartment for movement transversely thereof and swingably relative thereto between a normal position wherein one side of said cover member closes said opening and a reverse position wherein the other side of said cover member closes said opening, resilient means interconnecting said guided means and said cover member, said resilient means having a free position corresponding to a position of said cover member intermediate said normal and reverse positions and biasing said cover member from said normal and reverse positions thereof to said intermediate position, and latch means for holding said cover member in said normal and reverse positions thereof.

2. In combination with a vehicle body including a compartment therein, a cover arrangement for said compartment comprising, a cover member for closing the opening of said compartment, means mounting said cover member on said compartment for movement between a normal position wherein one side of said cover member closes said opening and a reverse position wherein the other side of said cover member closes said opening, means biasing said cover from either said normal or said reverse position thereof to a position intermediate said normal and reverse positions thereof, spaced latch means mounted on said compartment for selective and alternate engagement with one edge portion of said cover member to hold said cover member in either said normal or said reverse position thereof against the action of said biasing means, and a common operating means for releasing said latch means to permit said biasing means to move said cover member from either said normal or said reverse position thereof to said intermediate position thereof.

3. In combination with a vehicle body including a compartment therein, a cover arrangement for said compartment comprising, a cover member for closing the opening of said compartment, means mounting said cover member on said compartment for movement between a normal position wherein one side of said cover member closes said opening and a reverse position wherein the other side of said cover member closes said opening, means operable in a selected one of either of said positions to bias said cover member from said selected position toward the other of said positions, and selectively releasable latch means for holding said cover member in said normal and reverse positions thereof against the action of said biasing means, selective release of said latch means permitting said biasing means to move said cover member from said selected positions thereof to a position intermediate said normal and reverse positions thereof permitting access to said compartment.

4. In combination with a vehicle body including a compartment therein, a cover arrangement for said compartment comprising, a cover member for closing the opening of said compartment, guide means defining a path of movement transverse of said compartment, guided means movable along said guide means, means pivotally interconnecting said guided means and said cover member to mount said cover member on said compartment for movement transversely thereof and swingable relative thereto between a normal position wherein one side of said cover member closes said opening and a reverse position wherein the other side of said cover member closes said opening, means operable in a selected one of either of said positions to bias said cover member from said selected position toward the other of said positions, and selectively releasable latch means for holding said cover member in said normal and reverse positions thereof against the action of said biasing means, selected release of said latch means permitting said biasing means to move said cover member from said selected position thereof to a position intermediate said normal and reverse positions thereof permitting access to said compartment.

References Cited by the Examiner

UNITED STATES PATENTS

| | | | |
|---|---|---|---|
| 346,795 | 8/86 | Wilcox | 312—325 X |
| 804,362 | 11/05 | Wright. | |
| 1,964,339 | 6/34 | Brassell | 296—37 X |
| 2,552,898 | 5/51 | Lenci et al. | 296—37 |
| 2,964,781 | 12/60 | Morin | 16—189 X |
| 3,022,107 | 2/62 | Daniels | 296—37 |

A. HARRY LEVY, *Primary Examiner.*

PHILIP ARNOLD, *Examiner.*